United States Patent [19]

Ting

[11] Patent Number: 4,882,383

[45] Date of Patent: Nov. 21, 1989

[54] IMPACT MODIFIED POLY(ALKENYL AROMATIC) RESIN COMPOSITIONS

[75] Inventor: Sai-Pei Ting, New York, N.Y.

[73] Assignee: General Electric Co., Selkirk, N.Y.

[21] Appl. No.: 76,118

[22] Filed: Jul. 21, 1987

[51] Int. Cl.$^4$ .................. C08L 9/00; C08L 13/00; C08L 25/00; C08L 51/04
[52] U.S. Cl. .................. 525/71; 525/75; 525/80; 525/83; 525/84; 525/85; 525/86; 525/902; 525/903
[58] Field of Search .................. 525/71, 902, 903, 75, 525/80, 83, 84, 85, 86

[56] References Cited

U.S. PATENT DOCUMENTS

| | | | |
|---|---|---|---|
| 3,875,260 | 4/1975 | Patel et al. | 525/902 |
| 3,944,631 | 3/1987 | Yu et al. | 525/305 |
| 4,645,796 | 2/1987 | Beyer et al. | 525/902 |
| 4,696,973 | 9/1987 | Kamata et al. | 525/71 |

*Primary Examiner*—Allan M. Lieberman
*Attorney, Agent, or Firm*—Hedman, Gibson, Costigan & Hoare

[57] ABSTRACT

Thermoplastic compositions comprising rubber modified polyalkenyl aromatic resin and a modifying agent having a core-shell structure comprised of an interpenetrating, cross-linked (meth)acrylate core and a cross-linked styrenic resin shell have significantly improved impact strength, thermal resistance and surface appearance following molding into shaped articles.

20 Claims, No Drawings

IMPACT MODIFIED POLY(ALKENYL AROMATIC) RESIN COMPOSITIONS

The present invention relates to thermoplastic resin compositions having improved impact strength, thermal resistance and surface appearance after molding. More particularly, it pertains to combining a rubber modified poly(alkenyl aromatic) resin and an impact modifier having a core-shell structure comprised of a cross-linked (meth) acrylate core and a crosslinked styrene resin shell which forms an interpenetrating network between the core and the shell with minimal grafting between the structures.

BACKGROUND OF THE INVENTION

It is known that rubber modified poly(alkenyl aromatic) resins are useful thermoplastic materials having a wide range of applications. Such resins because of their relatively low cost have become widely used commodities in spite of some deficiencies in impact strength, thermal resistance and surface appearance, e.g., gloss in thermoformed articles.

One of the more important modifiers for improving properties of rubber modified poly(alkenyl aromatic) resin compositions is a saturated rubber known as Kraton G, available from Shell Chemical Company. Kraton G is a saturated triblock copolymer styrene-butadiene-styrene or styrene-ethylenebutylene-styrene (SEBS rubber). These modifiers provide useful impact strength improvements as well as superior thermal aging performance. The latter property is especially important in rubber modified poly(alkenyl aromatic) resin compositions designed for medium to high heat requirement applications. Such superior performance, however, has been achieved at relatively great expense compared to conventionally available impact modification systems and many manufacturers have sought to improve the properties of rubber modified poly(alkenyl aromatic) resin compositions with other impact modifier candidates.

Yu et al., U.S. Pat. No. 3,944,631, discloses the modifications of styrene-acrylonitrile copolymers by adding an effective amount of an additive comprising a cross-linked (meth)acrylate rubbery core and a cross-linked interpenetrating styrene-acrylonitrile resin shell. The modifier is said to improve both impact strength and weather resistance in articles molded therefrom.

In the copending, commonly assigned application of Bates, Ting and Haaf, Ser. No. 837,406, filed Mar. 07, 1986, now U.S. Pat. No. 4,705,428, there are disclosed compositions comprising the core-shell modifiers of Yu et al. in polyphenylene ether resins, alone, or in further combination with rubber modified poly(alkenyl aromatic) resins.

It has now been discovered that useful rubber modified polyalkenyl aromatic compounds can be provided which exhibit vastly improved impact strength combined with thermal stability and high gloss while other physical properties such as Heat Distortion Temperature (HDT) are unchanged or only slightly affected, such as flow and tensile strength. These improvements are achieved by combining the base resin with a modifying compound comprising the aforementioned core-shell modifier of Yu et al. The cross-linked core-shell modifier appears to improve the properties of the rubber modified poly(alkenyl aromatic) resin without suffering from the thermal degradation often experienced following the use of conventional modifiers of the unsaturated, i.e., non-hydrogenated type.

SUMMARY OF THE INVENTION

In accordance with the present invention, there are provided thermoplastic resin compositions comprising:
(a) a base resin comprising a rubber modified poly(alkenyl aromatic) resin; and
(b) a property improving amount of a modifying agent comprised of a cross-linked (meth)acrylate core and an interpenetrating cross-linked styrenic resin shell.

The invention also contemplates a process for improving the impact strength, thermal stability and surface appearance of articles molded from a thermoplastic resin composition, said process comprising:
(1) providing an intimate mixture comprising:
(a) a rubber modified poly(alkenyl aromatic) resin and
(b) a property improving amount of a modifying agent comprised of a crosslinked (meth) acrylate core and an interpenetrating crosslinked styrenic resin shell; and
(2) molding said mixture into an article.

Also provided by the invention are articles made by the process as above defined.

DETAILED DESCRIPTION OF THE INVENTION

The improved thermoplastic compositions of the present invention are based upon a combination of a rubber modified polyalkenyl aromatic resin and a property improving amount of a core-shell modifier having a cross-linked acrylate core which is surrounded and interpenetrated by a crosslinked styrene shell. The polyalkenyl aromatic compound is preferable polystrene or another polymer formed from the following: vinyl toluene, alpha methyl styrene, ethyl vinyl benzene, vinyl naphthalene, mono and polychlorostyrene, mono and poly-bromostyrene, and the like. The integrity of the core-shell structure is maintained by the interpenetration and entanglement of the cross-linked components rather than by grafting.

The base resin can be improved with various amounts of the core-shell modifier depending upon the particular thermoplastic application. Typically, at least 1 part by weight of the core-shell modifier will be required per 100 parts of the base resin. Less than one part will not ordinarily provide very much beneficial effect in the overall composition. Also, greater than 40 parts by weight of the core shell modifier will not ordinarily be utilized per 100 parts of the base resin since the beneficial properties of the rubber modified polyalkenyl aromatic resin can be overshadowed by the high rubber content of this loading of the core-shell modifier.

In typical embodiments, 5 to 30 pars by weight of the core-shell modifier will be utilized per 100 parts of the base resin.

Regarding the core-shell modifier, a preferred embodiment would be comprised of a cross-linked butyl acrylate core. This acrylate core will ordinarily comprise approximately 40 to 90 weight percent of the core-shell combination. As stated previously, the preferred shell component is comprised of cross-linked polystyrene.

The polyalkenyl aromatic resins useful in the present invention are the well-known styrenic-based materials which comprise units of the formula

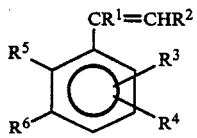

wherein $R^1$ and $R^2$ are selected from lower alkyl or alkenyl groups having from 1 to 6 carbon atoms or hydrogen; $R^3$ and $R^4$ are selected from chloro, bromo, hydrogen or lower alkyl of from 1 to 6 carbon atoms; $R^5$ and $R^6$ are selected from hydrogen, lower alkyl or alkenyl groups of from 1 to 6 carbon atoms, or $R^5$ and $R^6$ may be concatenated together with hydrocarbyl groups to form a naphthyl group. Examples of the substituent arrangements on useful polyalkenyl resin units are: (i) $R^1$, $R^2$, $R^3$, $R^4$, $R^5$ and $R^6$ are each hydrogen; (ii) $R^1$ is methyl and $R^2$, $R^3$, $R^4$, $R^5$ and $R^6$ are each hydrogen; (iii) $R^1$, $R^2$, $R^4$, $R^5$ and $R^6$ are each hydrogen and $R^3$ is methyl; or (iv) $R^1$, $R^2$, $R^5$ and $R^6$ are each hydrogen and $R^3$ and $R^4$ are bromine. Preferred styrenics are polystyrene and rubber-modified polystyrene (HIPS). The rubber modified styrenes can be provided by combining or grafting natural or synthetic rubber compounds (e.g., a diene rubber, an ethylene-propylene-diene terpolymer rubber (EPDM), a polybutadiene, or an acrylate rubber) with styrene polymers. Other desired polyalkenyl aromatic compounds can be formed from the following: vinyl toluene, alpha methyl styrene, ethyl vinyl benzene, vinyl naphthalene, mono and polychlorostyrene, mono and polybromostyrene, and the like. These well-known materials are available from a variety of commercial sources.

Those skilled in the art will be able to provide impact improved compositions comprising various proportions of the rubber modified polyalkenyl aromatic resin and the core-shell impact modifier. Conventional thermoplastic compounding technology such as single or twin screw extrusion can be utilized to provide compositions of the present invention.

The above-described weight ratios and the percentages represent the the compositional formulations of the present invention. The order of combining the components to provide final products may be varied as described below.

The preferable core-shell interpolymer modifiers are those having a cross-linked acrylate rubber core, such as butyl acrylate. Surrounding this cross-linked core is a shell-like structure of cross-linked styrenic resin, preferably styrene, which surrounds and interpenetrates the crosslinked core. Incorporation of small amounts of other monomers such as acrylonitrile and/or methyl methacrylate with styrene in the shell can also provide useful products if the resulting copolymer shell does not cause significant incompatibility with the rubber modified polyalkenyl aromatic matrix. The integrity of such preferable core-shell structures is maintained by the interpenetrating network of the several cross-linked moieties rather than by grafting the structures together. The interpenetrating network is provided when the monomers forming the shell structure are polymerized and cross-linked in the presence of the previously polymerized and cross-linked acrylate core.

The core-shell interpolymer compositions may be formed by the following type of two-step, sequential polymerization process:

1. emulsion polymerizing an acrylate monomer charge (herein designated "acrylate", for purposes of the present invention), of at least one $C_2$–$C_{10}$ alkyl acrylate, $C_8$–$C_{22}$ alkyl(meth)acrylate, or compatible mixtures thereof, in an aqueous polymerization medium in the presence of an effective amount of a suitable di- or polyethyleneically unsaturated crosslinking agent for such type of monomer, with the $C_4$–$C_8$ alkyl acrylates being the preferred acrylate monomers for use in this step;

2. emulsion polymerizing a monomer charge of styrene in an aqueous polymerization medium, also in the presence of an effective amount of a suitable di- or polyethyleneically unsaturated crosslinking agent for such monomers, said polymerization being carried out in the presence of the product form Step 1 so that the cross-linked (meth)acrylate and crosslinked styrene components form an interpolymer wherein the respective phases surround and penetrate one another.

Such a two-stage polymerization process is analogous to the three step process for producing an acrylate-styrene-acrylonitrile (ASA) terpolymer as taught by Yu et al. in U.S. Pat. No. 3,944,631 (which is hereby incorporated by reference).

This core-shell product, which is used as the interpolymer impact modifier in the present invention generally comprises from about 40% to about 90%, by weight, of at least one of the above-identified crosslinked acrylates, and from about 10% to about 60%, by weight of the crosslinked styrene component. It contains little graft polymerizaton between the cross-linked styrenic copolymer components and the cross-linked acrylate polymeric component. In the preferred embodiments, the core will comprise 50 to 80 weight percent cross-linked acrylate, based on the weight of cross-linked core and cross-linked shell taken together. Further details regarding this type of polymer composition can be found in the aforementioned U.S. Pat. No. 3,944,631 of Yu et al. The core-shell interpolymer provided by the foregoing process can be isolated and dried by conventional means and can be provided in powder or pellet form.

The compositions of the present invention will generally be comprised of approximately 1 to 40 parts by weight of the core-shell interpolymer modifier based upon 100 parts of the base resin. It is particularly preferred that about 5 to 30 parts by weight of the core-shell interpolymer additive will be used per 100 parts of the base resin.

The foregoing constituent ingredients can be compounded and molded by conventional means. The order of mixing and degree of shear experienced during extrusion can be varied. It would be expected that the physical properties could vary as such processing conditions are varied. Those skilled in the art will be able to achieve optimum processing conditions which may vary for different thermoplastic applications.

Thus in one instance, each of the ingredients could be blended and extruded at once, thereby providing thermoplastic resin having a particular property profile. Alternately it may be desirable to pre-blend or precompound some of the ingredients while the remaining ingredients are charged later in a compounding or extrusion process.

Additionally, it is expected that conventional additives such as fillers, pigments, stabilizers, plasticizers and flame retarding compounds can be incorporated in the thermoplastic compositions of the present invention, thereby providing a variety of useful products. For fillers, both reinforcing and non-reinforcing fillers are contemplated, including glass, clay and other mineral fillers. Conventional heat and oxidative stabilizers may be used. Among the useful flame retarding compounds which may be utilized are organic and inorganic halogen and phosphorus compounds with or without synergists such as, for example, antimony trioxide.

DESCRIPTION OF THE PREFERRED EMBODIMENTS

Specific embodiments of the present invention are taught in the following examples which are not limiting in any way. All parts are by weight unless otherwise indicated. All of the foregoing U.S. Patents are hereby incorporated by reference.

Synthesis of Core-Shell Additive

Preparation A: crosslinked core/crosslinked styrene shell

A crosslinked polybutylacrylate core having an interpenetrating, crosslinked polystyrene shell was prepared in a five liter, three-necked flask equipped with a heating/cooling jacket, a Teflon blade agitator, a thermometer and a nitrogen purge.

The following solutions were prepared:

| Solution A: | n-butyl acrylate | 751.4 g |
| | 1-3 butyleneglycol diacrylate | 1.27 g |
| Solution B: | Sodium Metabisulfite | 1.75 g |
| | deionized water | 27.4 g |
| Solution C: | Ammonium Persulfate | 4.84 g |
| | deionized water | 76.1 g |
| Solution D: | styrene | 250.6 g |
| | divinyl benzene (55% active solution from Dow Chemical) | 2.65 g |

Into the reaction flask was charged: 3,460 g deionized water, the following emulsifying agents: 2.1 g Sipex UB sodium lauryl sulfate (from Alcolac, Inc.) and 4.2 g Aerosol A-268, a disodium sulfosuccinate (from American Cyanamid), and 14.6 g of Solution B. The flask was stirred with $N_2$ sparge at room temperature for 30 minutes, to reduce the $O_2$ content.

Thereafter, 150.5 g of $N_2$ sparged Solution A was added. The flask contents were heated to 55° C. and then 13.5 g of Solution C was added to initiate polymerization.

Aftere 1.5 hours of reaction, a sample showed 4.1% resin solids indicating approximately 96% conversion. The remainder of Solution A as well as 14.6 g Solution B and 40.4 g Solution C were added. After 2.5 hours of additional reaction time at 55° C. a sample showed 17.2% resin solids, indicating greater than 97% conversion.

The reaction mixture was cooled to 35° C. and Solution D was added and mixed for 15 minutes at 35° C. The reaction mixture was then heated to 60° C. and the remainder of Solution C was added. The mixture was reacted for 1.25 hours. The temperature was raised to 75° C. and maintained for 45 minutes. A final sample showed 22.4% resin solids indicating a conversion greater than 98%.

The product latex was coagulated in a solution of 0.25 weight percent $CaCl_2$ in methanol at a rate of 1600 ml methanol per 800 ml latex. The coagulum was filtered, rinsed with fresh methanol, and dried in a vacuum oven at 60° C.

The product has a rubber content of 75% by weight, a number average latex particle diameter of 211 nanometers, a swell index in methyl ethyl ketone (MEK) of 8.1 and a percent Gel fraction from MEK extraction of 91.1%.

EXAMPLES 1-3

Several blends of a high impact polystyrene (HIPS) and the impact modifier of Preparation A were blended by a Henschel mixer, then extruded by an one inch Wayne single-screw extruder at a temperature profile of 350°-365°-375°-385° F. Extruded materials were injection molded into ASTM specimens by a 85 Toshiba injection molding machine at a temperature setting of 350° F.(melt)/130° F.(mold). The compositions used and the results obtained are set forth in the Table:

TABLE

| Example | Control | 1 | 2 | 3 |
|---|---|---|---|---|
| HIPS* | 100 | 100 | 100 | 100 |
| Geloy IM-XS** | — | 5 | 10 | 20 |
| HDT(F) ¼" @264 psi | 168 | 171 | 171 | 167 |
| Izod(ft-lb/in) | 5.6 | 6.5 | 8.0 | 8.6 |
| Gardner(in-lb) | 50 | 75 | 85 | 125 |
| TYS(psi) | 4620 | 4370 | 4260 | 4090 |
| TBS(psi) | 3720 | 3490 | 3400 | 3180 |
| TE(%) | 52 | 50 | 54 | 47 |
| Flow Channel(in) | 11.25 | 11 | 10.69 | 10.44 |
| Gloss(60 degree) | 40 | 43 | 45 | 48 |

*HIPS is a commercial rubber modified polystyrene. It contains ca. 10% butadiene rubber and has ca. 60,000 number-average molecular weight. It is sold by Huntsman Chemical Company under the designation Huntsman 1897.
**Detailed composition information of Geloy IM-XS is in patent application Serial No. 837,406, filed March 14, 1986, now allowed. The preparation employed is made by the procedure detailed hereabove.

The data in the Table demonstrate that the impact modifier of Preparation A is a very powerful impact modifier for HIPS. Not only is the impact strength of the composition significantly increased, but other important physical properties such as thermal resistance are either unchanged or slightly affected. Surface gloss is very high.

The above mentioned patents, patent applications and/or publications are incorporated herein by reference.

Many variations of the invention will suggest themselves to those skilled in this art in light of the foregoing detailed description. For example, instead of a modifier having a cross-linked n-butyl acrylate core, one having a cross-linked 2-ethylhexyl methacrylate core can be used. Modifiers having an alpha-methylstyrene, a vinyl toluene, or a nuclearly substituted dibromostyrene resin phase can be used. Instead of a diene-rubber modified HIPS, there can be used HIPS in which the rubber is an acrylate rubber or an EPDM rubber. All such obvious modifications are within the full intended scope of the appended claims.

I claim:
1. A thermoplastic resin composition comprising:
(a) a base resin comprising a poly(alkenyl aromatic) resin combined with or grafted with natural rubber or synthetic rubber selected from diene rubber or acrylic rubber, comprising units of the formula

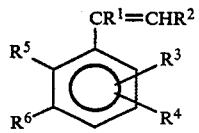

wherein $R^1$ and $R^2$ are selected from lower alkyl or alkenyl groups having from 1 to 6 carbon atoms or hydrogen; $R^3$ and $R^4$ are selected from chloro, bromo, hydrogen or lower alkyl of from 1 to 6 carbon atoms; $R^5$ and $R^6$ are selected from hydrogen, lower alkyl or alkenyl groups of from 1 to 6 carbon atoms, or $R^5$ and $R^6$ may be concatenated together with hydrocarbyl groups to form a naphthyl group; and (b) from about 1 to about 40 parts by weight of a modifying agent comprised of a crosslinked (meth)acrylate core and an interpenetrating crosslinked polyalkenyl aromatic resin shell per 100 parts of the base resin.

2. A composition as defined in claim 1 wherein said resin components (a) comprises units in which
 (i) $R^1$, $R^2$, $R^3$, $R^4$, $R^5$, and $R^6$ are each hydrogen;
 (ii) $R^1$ is methyl and $R^2$, $R^3$, $R^4$, $R^5$ and $R^6$ are each hydrogen;
 (iii) $R^1$, $R^2$, $R^4$, $R^5$ and $R^6$ are each hydrogen and $R^3$ is methyl; or
 (iv) $R^1$, $R^2$, $R^5$, and $R^6$ are each hydrogen and $R^3$ and $R^4$ are bromines.

3. A composition as defined in claim 2 wherein said rubber modified component (a) comprises units wherein $R^1$, $R^2$, $R^3$, $R^4$, $R^5$ and $R^6$ are hydrogen.

4. A composition as defined in claim 1 wherein the synthetic diene rubber is an EPDM rubber.

5. A composition as defined in claim 1 wherein the said diene rubber is polybutadiene.

6. A composition as defined in claim 1 wherein modifying agent (b) is present in an amount of from about 5 to about 25 parts by weight per 100 part by weight of the base resin.

7. A composition as defined in claim 1 wherein said crosslinked (meth)acrylate core is a cross-linked acrylate core.

8. A composition as defined in claim 7 wherein said acrylate is butyl acrylate.

9. A composition as defined in claim 1 wherein the cross-linked (meth)acrylate core comprises from about 40 to about 90 parts by weight per 100 parts by weight of the crosslinked core and crosslinked shell, taken together.

10. A process for improving the impact strength, thermal resistance and surface appearance of articles molded from a thermoplastic resin composition, said process comprising:
 (1) providing an intimate mixture comprising:
 (a) a poly(alkenyl aromatic) resin combined with or grafted with natural rubber or synthetic rubber selected from diene rubber or acrylic rubber, said resin comprising units of the formula

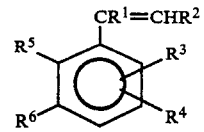

wherein $R^1$ and $R^2$ are selected from lower alkyl or alkenyl groups having from 1 to 6 carbon atoms or hydrogen; $R^3$ and $R^4$ are selected from chloro, bromo, hydrogen or lower alkyl of from 1 to 6 carbon atoms; $R^5$ and $R^6$ are selected from hydrogen, lower alkyl or alkenyl groups of from 1 to 6 carbon atoms, or $R^5$ and $R^6$ may be concateneated together with hydrocarbyl groups to form a naphthyl group; and (b) from about 1 to about 40 parts by weight of a modifying agent comprised of a cross-linked (meth)acrylate core and an interpenetrating cross-linked polyalkenyl aromatic resin shell per 100 parts of the base resin; and (2) molding said mixture into an article.

11. A process as defined in claim 10 wherein the intimate mixture is provided by melt mixing.

12. A process as defined in claim 10 wherein said rubber modified component of step 1(a) comprises units in which
 (i) $R^1$, $R^2$, $R^3$, $R^4$, $R^5$ and $R^6$ are each hydrogen;
 (ii) $R^1$ is methyl and $R^2$, $R^3$, $R^4$, $R^5$ and $R^6$ are each hydrogen;
 (iii) $R^1$, $R^2$, $R^4$, $R^5$ and $R^6$ are each hydrogen and $R^3$ is methyl; or
 (iv) $R^1$, $R^2$, $R^5$ and $R^6$ are each hydrogen and $R^3$ and $R^4$ are bromines.

13. A process as defined in claim 12 wherein said rubber modified component of step 1(a) comprises units wherein $R^1$, $R^2$, $R^3$, $R^4$, $R^5$ and $R^6$ are hydrogen.

14. A process as defined in claim 10 wherein the synthetic diene rubber is an EPDM rubber.

15. A process as defined in claim 10 wherein said rubber is a polybutadiene.

16. A process as defined in claim 10 wherein the modifying agent of step 1(b) is present in an amount of from about 5 to about 25 parts by weight per 100 part by weight of the base resin.

17. A process as defined in claim 10 wherein said cross-linked (meth)acrylate core is a cross-linked acrylate core.

18. A process as defined in claim 17 wherein said acrylate is butyl acrylate.

19. A process as defined in claim 10 wherein the cross-linked (meth)acrylate core comprises from about 40 to about 90 parts by weight per 100 parts by weight of the cross-linked core and cross-linked shell, taken together.

20. An article made by the process of claim 10.

* * * * *